F. E. Sickles,
Reciprocating Steam Engine,
No. 565,
Reissued June 1, 1858.
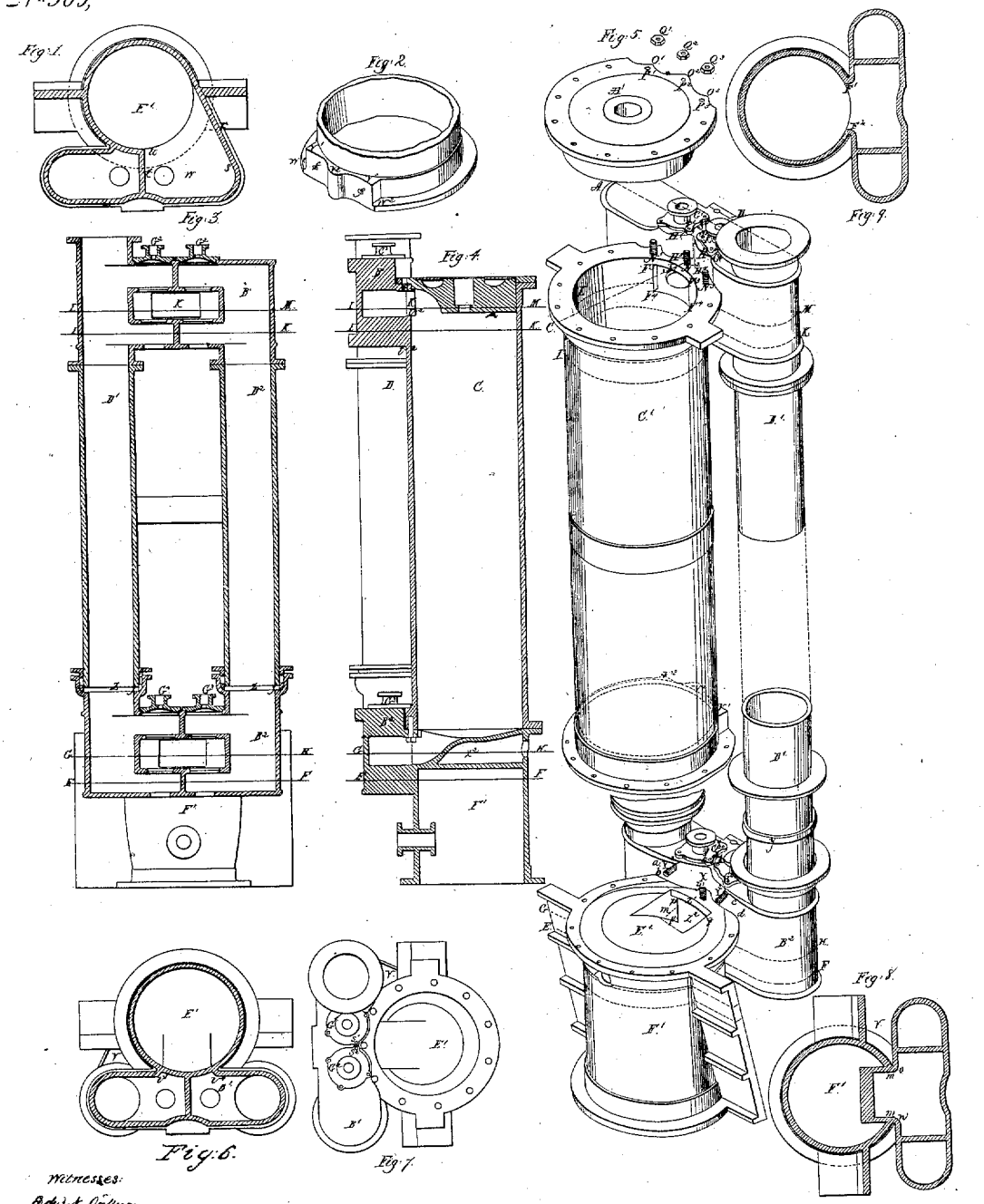
Witnesses:
Edw. A. Dillman
M. C. Richardson
Inventor:
Francis E. Sickles
N. PETERS, PHOTO-LITHOGRAPHER, WASHINGTON, D. C.

UNITED STATES PATENT OFFICE.

F. E. SICKELS, OF NEW YORK, N. Y.

IMPROVEMENT IN THE MODE OF CONNECTING STEAM-CYLINDERS WITH STEAM-CHESTS.

Specification forming part of Letters Patent No. 4,202, dated September 19, 1845; Reissue No. 565, dated June 1, 1858.

*To all whom it may concern:*

Be it known that I, FREDERICK E. SICKELS, of the city of New York, have invented a new and useful mode of forming, fastening, and connecting steam-chests to the cylinder or to the cylinder and condenser of balanced puppet-valve engines, by which they can be more practically, efficiently, and closely connected together, with less labor and weight in construction and more economy in operation than by any mode heretofore adopted; and I do hereby declare that the following is a full, clear, and exact description of the principle or character thereof which distinguishes it from all other things before known, and of the manner of making, constructing, and using the same, reference being had to the accompanying drawings, making part of this specification, in which the invention is shown as applied to a vertical beam engine as ordinarily constructed for steamboats, in which the condenser is located under the cylinder and in the same axis.

In the drawings, Figure 1 is a horizontal section through the condenser and chest; Fig. 2, an isometrical view of the lower end of the cylinder. Fig. 3 is a vertical section through the steam-chest and side pipes, taken at the line A B of Fig. 5. Fig. 4 is a vertical section through the steam chest and cylinder, taken at the line C D, Fig. 5; Fig. 5, an isometrical view of the steam-chest and side pipes, top and bottom of the cylinder, and the condenser, showing these parts before they are put together; Fig. 6, a horizontal section through the steam chest and cylinder at the line I K of Figs. 3, 4, and 5; and Fig. 9, a horizontal section through the cylinder and steam-chest at L M, Figs. 3, 4, and 5.

The same letters refer to like parts in all the views.

In forming the connection of the steam-cylinder with the steam-chest of balanced puppet-valve engines it has long been known to engineers that the closeness of this connection is important in an economic point of view not only on account of the weight and cost of the materials in making a long connection, but because all the steam contained in this connection is lost at each stroke of the engine, and hence various devices have been resorted to by engineers to surmount this difficulty. The steam-chest has been variously arranged and located; but all these devices have presented a large area between the chest and cylinder, for, the steam-chest being cast separate from the cylinder, sufficient room must be left to form the connection by bolted flanges, which necessarily occupy much room, and which do not support the plates through which the ports open with as much firmness in respect to each other as if they were cast directly upon the cylinder with the valve-seats closer to the point of support.

To remedy these evils is the object of my invention, the nature of which consists in casting the steam-chest in one piece with the steam-cylinder (or the one with the cylinder as shown in the drawings and the other with the cylinder bottom and condenser) by making the sides of the steam-chest and the plates which support the valves running into the circle of the cylinder and forming a part of the casting thereof, by means of which new mode of construction of balanced-valve steam-chests the loss of steam by the use of the ordinary flanged nozzle is prevented, and the valve-seats are much firmer and less liable to make the valves leak than in the ordinary construction. The width of the steam-opening $K'$ is formed by the curved line of the cylinder and the inside of the steam-chest running into each other at $F'$ $F^2$, and its height is represented by $F^3$ $F^4$. That portion of the outside of the steam-chest below the steam-opening $K'$, and extending in depth from $U'$ to $U^2$, Fig. 4, and in width from $U^3$ to $U^4$, Fig. 6, is made of a curvilinear form, and is a portion of the interior surface of the cylinder. If it be desired to have the condenser at some considerable distance from the cylinder, or to dispense with it entirely, as in the case of oscillating horizontal or non-condensing engines, then the chests may be both constructed alike, and if a vertical engine, such as is shown in the drawings, be made, the lower head can be fastened as the upper one is there shown.

The manner of arranging the different parts of the cylinder and heads for such an engine as is exhibited in the drawings, which present the most difficult case to the constructor for the application of this improvement, is sufficiently shown in the drawings without a more minute description, and is believed to require the least possible weight of metal and space which it is possible to use when this mode of construction is adopted.

I do not claim Letters Patent simply for casting the steam-chests in one piece with the cylinder, as that would not effect any saving of steam unless in connection with a new mode of construction by means of which the greater part of the nozzles is dispensed with; but I do claim—

So constructing balanced puppet valve engine steam-chests that a portion of the outside of the cylinder forms a portion of the inside of the chest, having the plates which contain the upper and lower valve-seats cast directly upon the cylinder, substantially as described, thus dispensing with the nozzle and nozzle-flanges and saving the steam heretofore lost by reason of their interposition between the chest and cylinder, as described.

FREDERICK E. SICKELS.

Witnesses:

EDWD. N. DICKERSON,

M. C. DICKERSON.